United States Patent
Suganuma et al.

(10) Patent No.: US 6,347,173 B1
(45) Date of Patent: Feb. 12, 2002

(54) OPTICAL COHERENCE REDUCTION METHOD AND ITS DEVICE, ILLUMINATING METHOD AND ITS SYSTEM AND OPTICAL FIBER BUNDLE

(75) Inventors: Hiroshi Suganuma, Ibaraki; Yutaka Imai, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/298,274

(22) Filed: Apr. 23, 1999

(30) Foreign Application Priority Data

May 15, 1998 (JP) .......................... 10-132883

(51) Int. Cl.$^7$ ............................... G02B 6/04
(52) U.S. Cl. ................... 385/115; 385/116; 359/618
(58) Field of Search ................. 385/115, 12, 116, 385/14, 119, 120; 359/631, 618; 356/450, 491, 486; 372/6; 362/554, 559

(56) References Cited

U.S. PATENT DOCUMENTS 4,892,406 A * 1/1990 Waters ....................... 356/486
6,249,381 B1 * 6/2001 Suganuma .................. 359/618

FOREIGN PATENT DOCUMENTS

JP 60-230629 11/1985 ........... G02B/27/00

OTHER PUBLICATIONS

T. Ishigure et al., "Graded–Index Polymer Optical Fiber for High–Speed Data Communication," Applied Optics, vol. 33, No. 19, Jul. 1, 1994, pp. 4261–4266.

D. Gloge, "Optical Power Flow in Multimode Fibers," The Bell System Technical Journal, vol. 51, No. 8, Oct. 1972, pp. 1767–1783.

D. Gloge, "Impulse Response of Clad Optical Mulimode Fibers," The Bell System Technical Journal, vol. 52, No. 6, pp. 801–816.

D. Kohler et al., "Speckle Reduction in Pulsed–Laser Photographs," Optics Communications, vol. 12, No. 1, Sep. 1974, pp. 24–29.

M. Tsubokura et al., "Improvement of Hollow Guide for UV Laser Power Delivery," The Japan Society of Applied Physics, Extended Abstracts (The 58TH Autumn Meeting), Oct. 1997, Lecture Meeting Manuscripts, 3a–SR–18, pp. 1091.

Ogoshi et al., "Optical Fibers," OHM Publishers, 1983, Chapter 9, pp. 234–249.

* cited by examiner

*Primary Examiner*—Phan T. H. Palmer
(74) *Attorney, Agent, or Firm*—Oblon, Spivak, McClelland, Maier & Neustadt, P.C.

(57) ABSTRACT

To realize the reduction of the coherence of coherent light by an optical fiber bundle including optical fibers provided with the necessary minimum difference in optical path length, the coherence of coherent light is reduced via an optical fiber bundle in which plural multimode optical fibers having a difference in length exceeding the coherence length of an outgoing light beam are bundled or an optical fiber bundle in which plural multimode optical fibers having a difference in length exceeding 60 percent of the coherence length of incident coherent light are bundled.

36 Claims, 10 Drawing Sheets

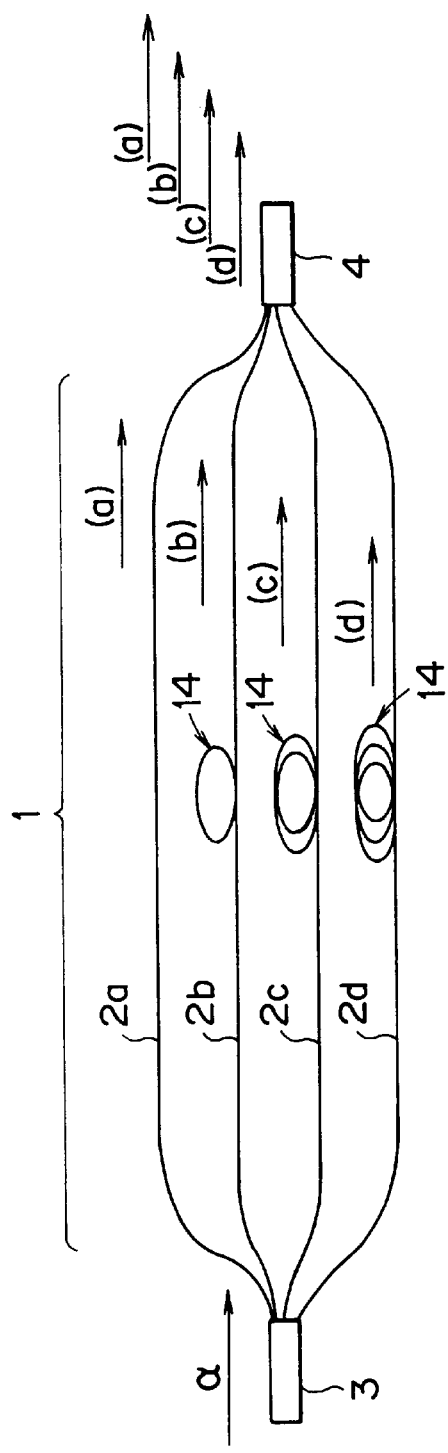
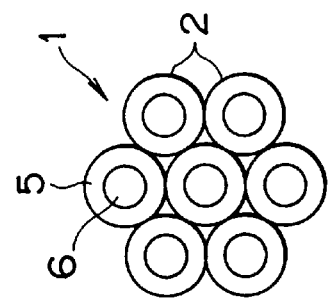
FIG. 1A
FIG. 1B

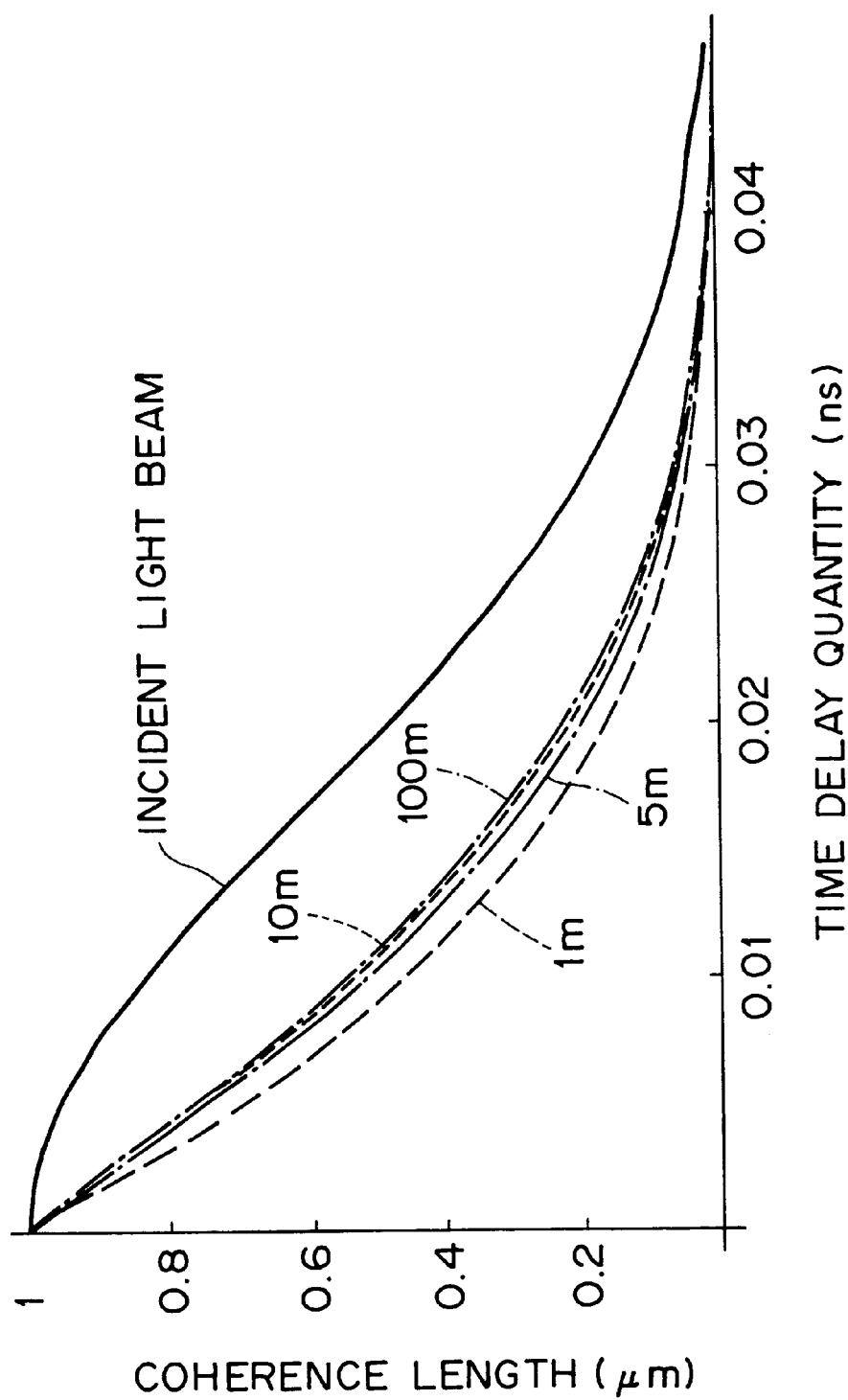
F I G. 5

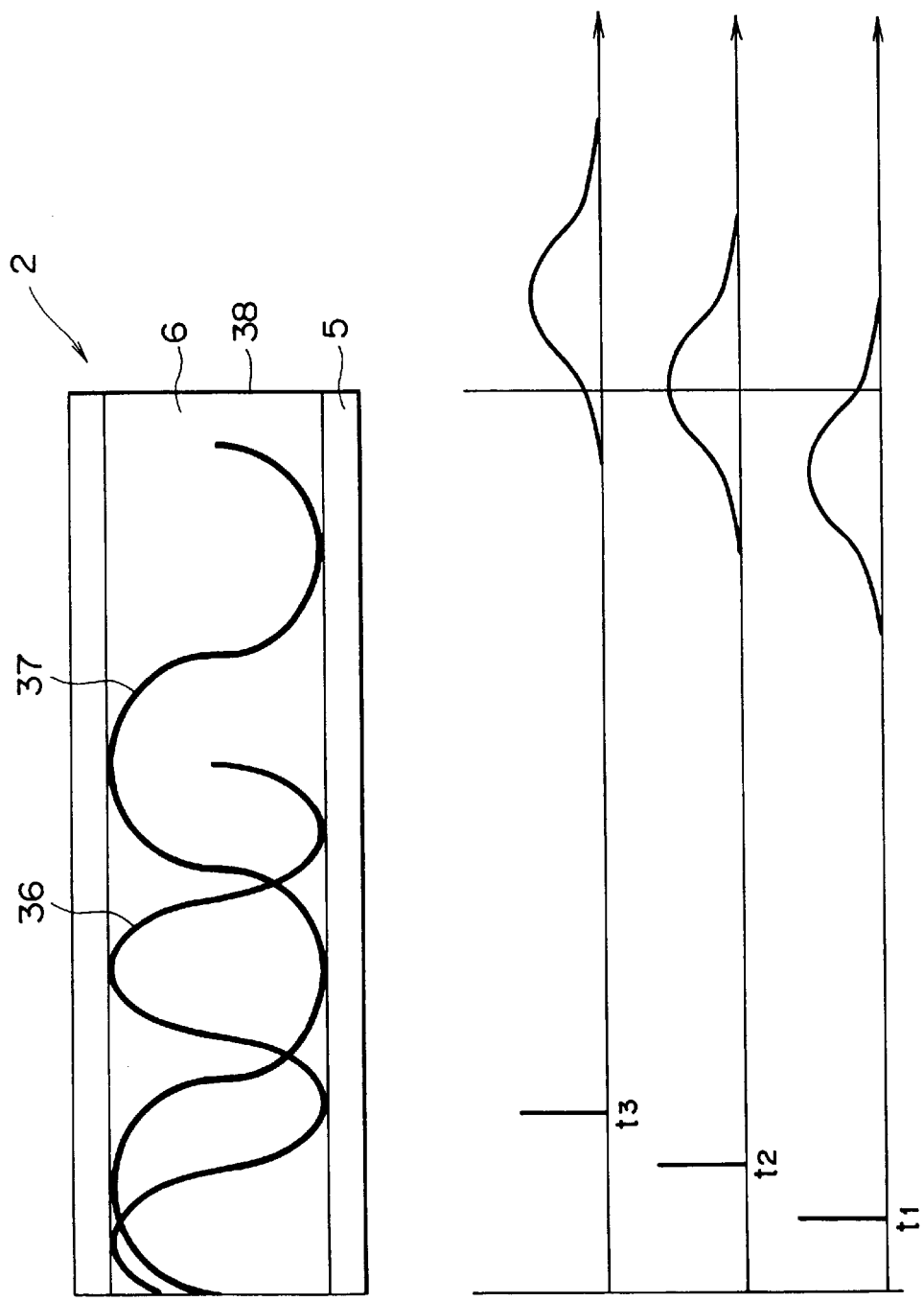

OPTICAL COHERENCE REDUCTION METHOD AND ITS DEVICE, ILLUMINATING METHOD AND ITS SYSTEM AND OPTICAL FIBER BUNDLE

BACKGROUND OF THE INVENTION

1. Field of the Invention

The present invention relates to an optical coherence reduction method and device, an illuminating method and system and an optical fiber bundle.

2. Description of the Related Art

Heretofore, for a light source for illumination used for a luminaire for a projection-type liquid crystal display, measuring device and others, incoherent light source such as a lamp and a light emitting diode (LED) have been used because of various reasons such as costs and simplicity.

A laser beam emitted from a laser such as a solid state laser, a gas laser or a semiconductor laser has been used for illumination. A laser beam is excellent in directivity, is simultaneously provided with high luminous intensity and is a light beam high in coherence. However, a technically most difficult problem is "speckle" (i.e. speckle noise) caused by high coherence.

For example, a semiconductor laser is a light source, the photoelectric conversion coefficient of which is very high and which emits a laser beam excellent in directivity. However, a semiconductor laser has rarely been used for a light source for illumination because of a speckle problem caused by high coherence.

In the 1970s, research on a display using a laser beam (hereinafter called a laser display) was conducted in various places. However, one of the problems which prevented practicality was the generation of speckle in addition to problems such as the shortage of output from a light source and a modulating method.

Recently, there has been rapid progress in the technical development of elements which are key components of a laser display, such as: a high output laser using the conversion of wavelength by a solid state laser; a semiconductor laser which can oscillate beams in three primary colors of red (R), green (G) and blue (B); a spatial light modulator (a light bulb) using liquid crystal and a micro machine; and other elements.

When N pieces of speckle patterns incoherent mutually, (that is, which do not interfere with one another and are not correlated) are overlapped, the sum is equivalent to the sum of the intensity of each speckle pattern and the contrast of speckles is reduced by up to $1/\sqrt{N}$.

Therefore, if N pieces of optical fiber are bundled and the length of each optical fiber is differentiated by a quantity in which coherence is lost, the interference between the optical fibers can be ignored. The resulting speckle is equivalent to the overlap of the intensity of speckle patterns $I_1, I_2 \ldots, I_N$ caused by each optical fiber. Therefore, the contrast of a speckle is reduced by equalization. That is, if N pieces of speckle patterns which are not correlated and are equal in intensity are overlapped, the contrast becomes $1/\sqrt{N}$.

A speckle (pattern) has also been a large problem in the field of a semiconductor exposure system and measures against it have been taken. The problem exists because an excimer laser has been adopted as a short wave-length light source to enhance resolution.

For example, in exposure processing related to a semiconductor device, a coherence reduction method is proposed that provides for a flying eye lens 20 composed of elements different in length, as shown in FIG. 7, used for the control of coherence. That is, a measure against speckle and a lens 21 is arranged in a position apart from flying eye lens 20 by distance f between the end face on the side of outgoing radiation of the flying eye lens 20 and a mask 22. (Refer to Lighting Optical System written by Messrs. Shibuya and Uehara and Japanese published examined patent application No. Sho 60-230629.)

However, according to this method, because the length of each element of the flying eye lens 20 is extended and the size of a lighting area from each element is different (as shown in FIG. 7), problems result, including a reduction in efficiency.

It is proposed in Japanese Patent Application No. Sho 63-22131 to realize a similar effect using a prism 23 shown in FIG. 8. However, as for the above method, the coherence reduction effect is insufficient and the optical loss is large.

In principle, a similar effect can be obtained using the dispersion of a refractive index. However, obtaining a sufficient effect by using the normal dispersion of a refractive index has been hampered by a problem in that an element becomes huge to reduce coherence.

In addition, other coherence control methods have been proposed. However, according to any of these methods, a speckle caused between an illuminating body and the naked eye cannot be sufficiently reduced in a display, a microscope, etc. Further, to remove a speckle, coherence control more severe than in a projection exposure system according to lithography and others is required.

That is, as shown in FIG. 9, the image 27 of an object 24 illuminated by an illuminating beam a, is formed on a screen 26 via a lens 25. When a phase is disturbed at random because of the rough surface of the object 24 or the state of the optical surface of the lens 25 in the case illuminating beam a is coherent light, a speckle is included in the image 27 on the screen 26.

Further, as schematically shown in FIG. 10, this means imaging the image on a screen 32 of an object 30 via a lens 31 on a retina 34 in an eye ball 33, that the image of the object on the screen via the lens may be observed with eyes. That is, in this process, the random displacement of a phase is caused on an optical path by the confusion of a beam on the screen 32 and the eye-ball 33 and a speckle is also caused in an imaging process. If spatial coherence operates on the plane of an image even if a speckle is not superposed on the image on the screen 32, a secondary speckle is caused on the retina 34 or on the retina of an observer 28 shown in FIG. 9.

The effect upon a speckle caused on the naked eye cannot be reduced by much even if these methods are used, because methods, such as the fluctuation of a mirror and a rotary diffusion plate, used in a projection exposure system based upon lithography does not reduce coherence but only moves and averages a speckle. To apply these methods to a display and others, vibration of a screen is required so that positional relationship between an illuminating body, such as a screen and an eye, is varied. (Refer to pp. 1290 to 1294 of "Speckle-free rear-projection screen using two close screens in slow relative motion", Vol. 66, No. 11 of Journal of Optical Society of America written by Epic G. Rawson, Antonio B. Nafarrate, Robert E. Norton, Joseph W. Goodman and published in November, 1976.) However, the above method is very inconvenient for practical purposes.

Heretofore, an optical fiber has been developed mainly for communication and for its material. Conventionally, a glass fiber mainly composed of quartz has been mainly used. To avoid mode dispersion, a single-mode optical fiber has been mainly developed.

As for a glass fiber, dispersion increases in a visible short wave-length region and its transmissivity is deteriorated. Therefore, the application of an optical fiber to visible light has been limited to an illuminating multimode optical fiber bundle which does not require transmission over a long distance. Particularly, because the intensity distribution of an outgoing beam is uniform if a multimode optical fiber is used, it is also a large merit that a complicated optical system such as a flying eye lens is not required.

Recently, a plastic multimode optical fiber has been developed and has attracted attention. (Refer to pp. 4261 to 4266 of "Graded-index polymer optical fiber for high-speed data communication", Vol. 33, No. 19 of Applied Optics written by Takaaki Ishigure, Eisuke Nihei and Yasuhiro Koike and published on Jul. 1, 1994.) Compared with glass fiber, plastic multimode optical fiber is low-priced, light, and shows the largest transmission efficiency in a visible region. Further, its multimode dispersion is also very large, compared with that of formal glass fiber.

Recently, a hollow waveguide for transmitting an ultraviolet laser beam has also been researched. (Refer to "Improvement of a hollow waveguide for transmitting ultraviolet laser power" written by Messrs. Tsubokura, Hashishin and Kubo of the 58th Applied Physics lecture meeting manuscripts 3a-SR-18.)

It is already know that the contrast of a speckle is reduced by the multimode dispersion of coherent light transmitted in a multimode optical fiber. (Refer to pp. 128 to 134 of "The fluctuation characteristics and a speckle of an optical fiber" of Vol. 8, No. 3 of Optics written by Mr. Imai and published in 1979.)

That is, as shown in FIG. 11, in a multimode optical fiber 2 composed of a core 6 and a clad 5, light beams respectively provided with a different mode component correspond to light beams incident at different times ($t_1$, $t_2$ and $t_3$) at the outgoing end 38 of the multimode optical fiber 2, because a laser beam (a light beam) 36 and a laser beam (a light beam) 37 respectively provided with a different mode are respectively provided with different propagation velocities. Therefore, if a spread by the above multimode dispersion is larger than the coherent length, the coherence of an outgoing beam is deteriorated.

However, in such an independent multimode optical fiber, it is difficult to propagate a laser beam of sufficiently large luminous intensity. Also, as a laser beam outgoing from each optical fiber is provided with coherence even if such multimode optical fibers are bundled, it is difficult to control coherence, (that is, to sufficiently reduce a speckle). Moreover, to apply a multimode optical fiber to illumination for practical use, an optical fiber having large dispersion and high transmissivity in the visible area is required.

D. Gloge ignored the mode in the radial direction of a multimode weakly-coupled optical fiber, analyzed in relation to only the propagation on a time base of power and acquired the impulse response of the multimode optical fiber. (Refer to pp. 801 to 816 of Vol. 52, No. 6 of "Bell Syst, Tech. Jour." written by D. Gloge and published in 1973, pp. 1767 to 1783 of Vol. 51, No. 8 of "Bell Syst. Tech. Jour." written by D. Gloge and published in 1972 and Chapter 9 of "Optical Fiber" written by Messrs. Ogoshi, Okamoto and others published by Ohm in 1983.)

In other words, if the modes of light beams propagated in an optical fiber are weakly coupled, the movement of power occurs between the modes because of the fluctuation of a refractive index during propagation, the bending of the optical fibers and other factors. Particularly, if there, are multiple modes and a light beam is propagated via the movement of power between modes many times, one input beam spreads in some modes. In such a case, only the transfer function in the direction of the optical axis of an optical fiber is important. Therefore, modes having the same propagation constant based upon an optical axis can be effectively analyzed statistically as one group.

In the 1970s, it as proved that the contrast of a speckle was reduced by inserting an irregular fiber bundle. (Refer to pp. 24 to 28 of "Speckle reduction in pulsed-laser photographs" of Opt. Commu., 12 written by D. Kohler, W. L. Seitz, T. R. Loree and D. Gardne and published in 1974.) Further, it is proposed to reduce a speckle using a bundle of optical fibers (i.e. an optical fiber bundle) the coherence length of which is longer than the coherence length of a laser beam source. (Refer to Japanese Published Unexamined Patent Application No. Hei 6-167640 and Japanese Patent Application No. Hei 104-5646 applied by these applicants on Feb. 6, 1998.)

However, when the number of fiber bundles is increased to reduce the contrast of a speckle, the difference in length between the shortest optical fiber and the longest optical fiber becomes rather large even if the difference in length between fibers, that is, the difference in optical path length, is slight. For example, if a semiconductor laser in a single mode is used for a light source, the typical coherence length of the light source is approximately 1 m. As a system must be large-sized to generate such a difference in optical path length, and the increase of the number of fiber bundles is difficult.

If one hundred optical fibers are bundled and each outgoing end and each incident) end are respectively aligned, even if a difference in optical path length of 1 cm is made between optical fibers, the difference in length between the shortest optical fiber and the longest optical fiber is 1 m. In this case, handling is very inconvenient.

Further, it is desirable that the length of an optical fiber (that is, the difference in optical path length in an optical fiber bundle) is made as short as possible from the viewpoint of efficiency in utilizing light because the transmissivity is deteriorated if and optical fiber is extended, as disclosed in the above Japanese published unexamined patent application No. Hei 6 -167640 and others.

It is difficult to utilize various lasers for a light source as illumination because a simple, low-priced and high-performance coherence control technique has not been disclosed in the publications described above. This prevents application to a luminaire using a laser beam, such as a display.

Particularly, in case the above problems are to be solved, e.g., using an optical fiber bundle, there arise major difficulties in that the length of an optical fiber is extended and loss during propagation in the optical fiber is increased. Also, it is inconvenient to handle optical fibers because the length of each optical fiber is greatly different, etc.

SUMMARY OF THE INVENTION

The present invention is made in view of the above situation and the object is to provide an optical coherence reduction method and a corresponding device for sufficiently reducing the coherence of a light beam using an optical fiber bundle obtained by bundling multimode optical fibers of different length so that the number of optical fibers in the bundle is a minimum.

Another object of the present invention is to provide an illuminating method and a corresponding system for utilizing a light beam obtained by reducing the coherence and speckle noise of a light beam.

Still another object of the present invention is to provide an optical fiber bundle in which multimode optical fibers of different length are bundled, so that the number of the optical fibers is the minimum required to sufficiently reduce the coherence of a light beam.

The present invention relates to an optical coherence reduction method (hereinafter, called a coherence reduction method) for reducing the coherence of incident coherent light via an optical fiber bundle in which these multimode optical fibers are bundled using plural multimode optical fibers provided with a difference in optical path length exceeding the coherence length between outgoing light beams (that is, having a difference in optical path length exceeding the coherence length between outgoing light beams).

According to the coherence reduction method of the present invention, as the coherence of incident coherent light is reduced via an optical fiber bundle obtained by bundling plural multimode optical fibers having a difference in optical path length exceeding the coherence length between an outgoing light beam outgoing from the multimode optical fiber, the difference in optical path length between two arbitrary multimode optical fibers in the above optical fiber bundle exceeds the coherence length of an outgoing light beam from either multimode optical fiber. Therefore, the minimum difference in optical path length which is necessary to sufficiently reduce the coherence of incident coherent light is generated.

Particularly, plural optical fibers having a difference in optical path length exceeding the coherence length of a light beam from a light source are not required to be bundled because an optical fiber bundle (i.e. a multimode optical fiber bundle) obtained by bundling plural multimode optical fibers having a difference in optical path length exceeding the coherence length of an outgoing light beam from the multimode optical fiber is used and the coherence length of an outgoing light beam from the multimode optical fiber is sufficiently shorter than the coherence length of incident coherent light. The[, the] length of each optical fiber (that is, the difference in optical path length) can be sufficiently reduced, compared with a case that plural optical fibers are bundled as described above. Therefore, an optical fiber bundle in which each optical fiber is bundled can be miniaturized and lightened. Simultaneously, the coherence of incident coherent light can be sufficiently reduced.

The present invention also provides an optical coherence reduction device (hereinafter, called a coherence reduction device according to the present invention) wherein plural multimode optical fibers provided with a difference in optical path length exceeding the coherence length of an outgoing light beam (that is, having a difference in optical path length exceeding the coherence length of an outgoing light beam) are used and the coherence of incident coherent light is reduced via an optical fiber bundle in which these multimode optical fibers are bundled as a device for repeatedly executing the above coherence reduction method according to the present invention.

The present invention also includes an illuminating method (hereinafter, called an illuminating method according to the present invention) in which plural multimode optical fibers provided with a difference in optical path length exceeding the coherence length of an outgoing light beam (that is, having difference in optical path length exceeding the coherence length of an outgoing light beam) are used. The coherence of incident coherent light outgoing from a light source is reduced via an optical fiber bundle in which these multimode optical fibers are bundled and a light beam, the coherence of which is reduced, is utilized for illumination.

According to the illuminating method of the present invention, the difference in optical path length between two arbitrary multimode optical fibers in the above optical fiber bundle exceeds the coherence length of an outgoing light beam from either multimode optical fiber because the coherence of incident coherent light outgoing from a light source is reduced via an optical fiber bundle in which plural multimode optical fibers having a difference in optical path length exceeding the coherence length of an outgoing light beam, outgoing from the multimode optical fiber, are bundled. Therefore, the minimum difference in optical path length which is necessary to reduce the coherence of incident coherent light sufficiently is generated and a light beam the coherence of which is reduced can be effectively utilized for illumination.

Particularly, plural optical fibers having a difference in optical path length exceeding the coherence length of a light beam from a light source are not required to be bundled because an optical fiber bundle obtained by bundling plural multimode optical fibers having a difference in optical path length exceeding the coherence length of an outgoing light beam from the multimode optical fiber is used and the coherence length of an outgoing light beam from the multimode optical fiber is sufficiently shorter than the coherence length of incident coherent light, as disclosed in the above Japanese Published Unexamined Patent Application No. Hei 6-167640 and others. The length of each optical fiber (that is, the difference in optical path length) can be sufficiently reduced, compared with a case that plural optical fibers are bundled as described above. Therefore, an optical fiber bundle in which each optical fiber is bundled can be miniaturized and lightened. Simultaneously, the coherence of incident coherent light can be sufficiently reduced and a light beam for illumination the speckle noise of which is small can be obtained.

The present invention also provides a luminaire (hereinafter, called a luminaire according to the present invention) wherein plural multimode optical fibers having a difference in optical path length exceeding the coherence length of an outgoing light beam are used. The coherence of incident coherent light outgoing from a light source is reduced via an optical fiber bundle in which these multimode optical fibers are bundled. The outgoing light beam, the coherence of which is reduced, is utilized for illumination.

Further, the present invention provides an optical fiber bundle (hereinafter, called an optical fiber bundle according to the present invention) in which plural multimode optical fibers provided with a difference in optical path length exceeding the coherence length of an outgoing light beam (that is, having a difference in optical path length exceeding the coherence length of an outgoing light beam) are bundled.

Plural optical fibers having a difference in length exceeding the coherence length of a light beam from a light source are not required to be bundled because in the optical fiber bundle according to the present invention, plural multimode optical fibers having a difference in optical path length exceeding the coherence length of a light beam outgoing from each multimode optical fiber are bundled and the coherence length of a light beam outgoing from the multimode optical fibers is sufficiently shorter than the coherence length of incident coherent light, as disclosed in the above Japanese Published Unexamined Patent Application No. Hei 6-167640 and others. The length of each optical fiber (that is, the difference in optical path length) can be sufficiently reduced, compared with the above case. Therefore, the optical fiber bundle can be miniaturized and lightened. Simultaneously an optical fiber bundle provided with the capability for sufficiently reducing coherence can be obtained.

BRIEF DESCRIPTION OF THE DRAWINGS

FIGS. 1A and 1B are schematic drawings showing a fiber bundle which can be used in a first embodiment of the present invention;

FIG. 5 is another graph showing the variation of the temporal coherence of a light beam outgoing from optical fibers having lengths of 1, 5, 10 and 100 meters (in case the coherence length Lc of an incident light beam is 7.0 mm);

FIG. 11 is a schematic drawing for explaining a principle for reducing coherence by mode dispersion in an optical fiber.

DESCRIPTION OF THE PREFERRED EMBODIMENTS

Figure 2:
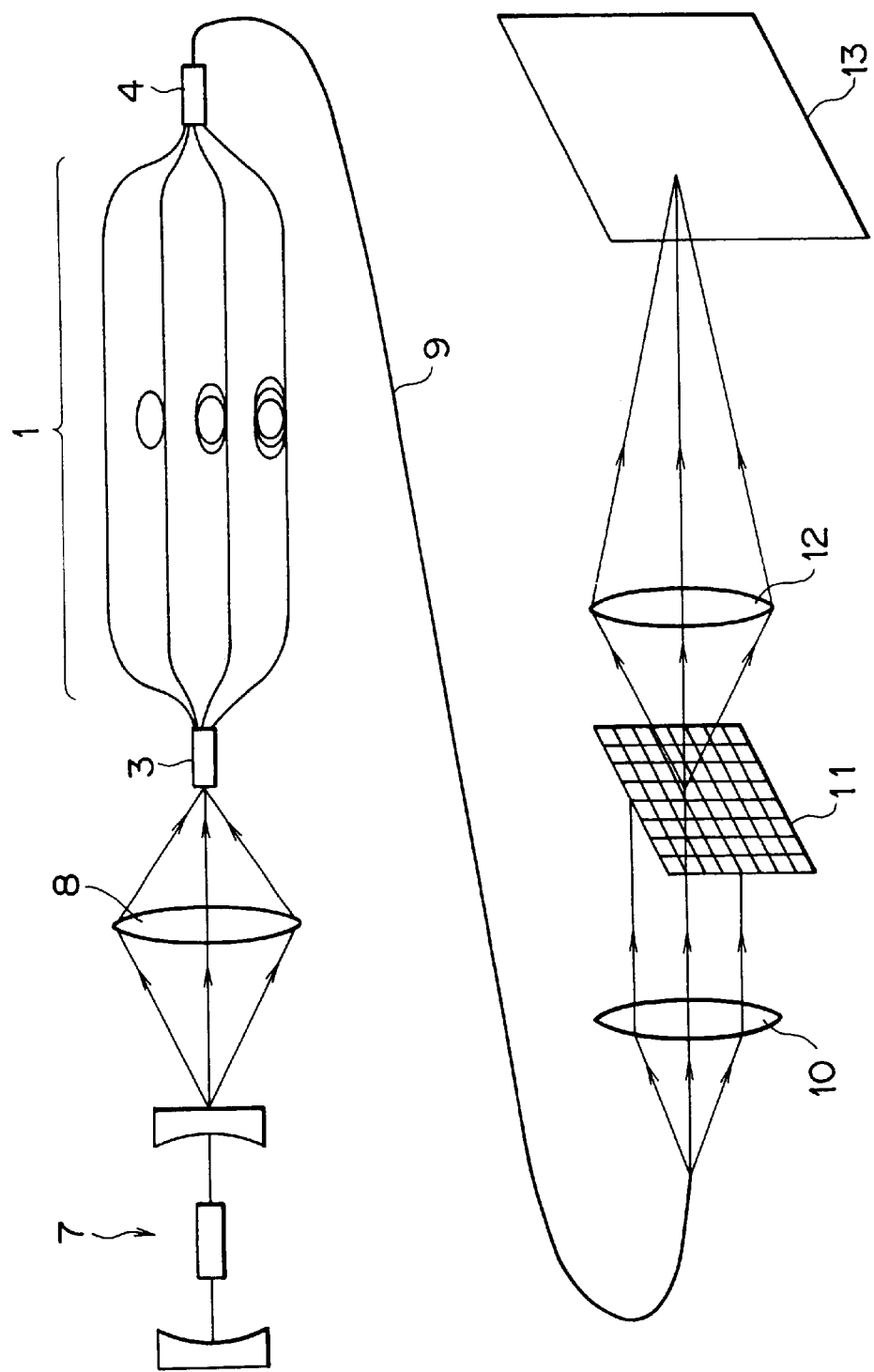
FIG. 2 is a schematic block diagram showing a luminaire equivalent to the first embodiment.

First, a coherence reduction method and a corresponding device according to the present invention will be described, respectively.

As for the coherence reduction method and device according to the present invention, it is desirable to use multimode optical fibers having a difference in length exceeding the coherence length of an outgoing light beam for the above plural multimode optical fibers. For the above optical fiber bundle, it is desirable to use a multimode optical fiber bundle in which multimode optical fibers having a difference in length exceeding 60 percent of the coherence length of the above incident coherent light are bundled is used. Further, the above optical fiber bundle may be a multimode optical fiber bundle in which bundled multimode optical fibers have a difference in length shorter than the coherence length of the above incident coherent light.

However, the coherence length of an outgoing light beam from a multimode optical fiber is equivalent to approximately 60 percent of the coherence length of a light beam before incidence (that is, incident coherent light). Therefore, if plural optical fibers having a difference in length exceeding 60 percent (further, shorter than 100 percent) of the coherence length of a light beam from a light source are bundled, a sufficient effect for reducing coherence is obtained. The same result is obtained even if the plural optical fibers having a difference in length exceeding the coherence length of a light beam from the light source are not necessarily bundled in the case a multimode optical fiber is used. Simultaneously, the device as a whole can be miniaturized and lightened. If the above incident coherent light is a multimode laser beam, for example, it is considered that the coherence length of a light beam outgoing from a multimode optical fiber also becomes shorter. The details are described later.

If the coherence length of the incident coherent light is $L_c$, the difference in optical path length ($L_{n+1}-L_n$) of M multimode optical fibers having length $L_n$ (where n=1, 2, ..., m) and having core material with a refractive index of $N_{core}$ should be governed by the following equation:

$$(L_{n+1}-L_n) \geq (0.6 \cdot L_c)/n_{core} \qquad \text{Expression (1)}$$

In other words, if the difference in optical path length ($L_{n+1}-L_n$) between two arbitrary multimode optical fibers in the above optical fiber bundle is larger than a value obtained by dividing 60 percent of the coherence length (Lc) of incident coherent light by the refractive index ($n_{core}$) of a core, the coherence of the above incident coherent light can be sufficiently reduced.

Further, it is desirable that the incident end and the outgoing end of incident coherent light in the above optical fiber bundle are respectively aligned. Hereby, the efficiency of the incidence of a light beam incoming in the above optical fiber bundle is enhanced. Simultaneously, a light beam outgoing from the optical fiber bundle is equalized and the efficiency of utilizing light can be enhanced.

Next, an illuminating method and a luminaire according to the present invention will be described, respectively.

In the illuminating method and the luminaire according to the present invention, it is desirable to use multimode optical fibers having a difference in length exceeding the coherence length of an outgoing light beam for the above plural multimode optical fibers. For the above optical fiber bundle, it is desirable to use a multimode optical fiber bundle in which bundled multimode optical fibers have a difference in length exceeding 60 percent of the coherence length of the above incident coherent light. Further, the above optical fiber bundle may be a multimode optical fiber bundle in which bundled multimode optical fibers have a difference in length shorter than the coherence length of the above incident coherent light.

However, the coherence length of an outgoing light beam from a multimode optical fiber is equivalent to approximately 60 percent of the coherence length of a light beam before incidence (that is, incident coherent light). Therefore, if plural optical fibers are bundled which have a difference in length exceeding 60 percent (further, shorter than 100 percent) of the coherence length of a light beam from a light source are used, q sufficient effect for reducing coherence and further, a sufficient effect for reducing speckle are obtained. The same result may be achieved even if the plural optical fibers having a difference in length exceeding the coherence length of a light beam from the light source are not necessarily bundled, such as in the case a multimode optical fiber is used. Simultaneously, the luminaire as a whole can be miniaturized and lightened. The details are described later.

In other words, if difference in optical path length ($L_{n+1}-L_n$) between arbitrary two multimode optical fibers in the above optical fiber bundle is larger than a value obtained by dividing 60 percent of the coherence length (Lc) of incident coherent light by the refractive index ($n_{core}$) of a core, the coherence of the above incident coherent light is sufficiently reduced and a light beam for illumination the speckle noise of which is small may be obtained.

Also, it is desirable that the incident end and the outgoing end of incident coherent light in the above optical fiber bundle are aligned. Hereby, the efficiency of the incidence of a light beam incoming in the above optical fiber bundle is enhanced. Simultaneously, an area illuminated by a light beam outgoing from the optical fiber bundle is equalized and the efficiency of utilizing light can be enhanced.

Also, the above incident coherent light may be a laser beam obtained by nonlinearly converting the wavelength of a laser beam emitted from a semiconductor laser or a laser beam emitted from a solid state laser.

That is, for the above light source, an arbitrary laser beam source, such as a semiconductor laser and a solid state laser, can be used and a laser beam, the coherence of which is sufficiently reduced, which is excellent in directivity and which is simultaneously provided with high luminous intensity can be utilized for illumination. The above incident coherent light may also be a single-mode laser beam. However, a multimode laser beam is desirable because the coherence length of a light beam outgoing from a multimode optical fiber further becomes short.

The above light beam for illumination can be utilized, e.g., as an illuminating light for a display, a measuring device, a microscope, such as a fluorescence microscope, and an exposure device, such as an exposure device for the minute processing of a semiconductor device.

Next, an optical fiber bundle according to the present invention will be described.

It is desirable in an optical fiber bundle according to the present invention, to use multimode optical fibers which have a difference in length exceeding the coherence length of an outgoing light beam for the above plural multimode optical fibers. The above optical fiber bundle may be an optical fiber bundle (a multimode optical fiber bundle) in which bundled multimode optical fibers have a difference in length exceeding 60 percent of the coherence length of incident coherent light. Further, the above optical fiber bundle may be an optical fiber bundle in which bundled multimode optical fibers have a difference in length which does not exceed the coherence length of incident coherent light.

The coherence length of an outgoing light beam from a multimode optical fiber is equivalent to approximately 60 percent of the coherence length of a light beam before incidence (that is, incident coherent light). Therefore, if plural optical fibers are bundled which have a difference in length exceeding 60 percent (further, not exceeding 100 percent) of the coherence length of a light beam from a light source are used, a sufficient effect for reducing coherence is obtained. The same result may be obtained even if the plural optical fibers having a difference in length exceeding the coherence length of a light beam from the light source is not necessarily bundled, such as in the case a multimode optical fiber is used. Simultaneously, the whole device can be miniaturized and lightened. The details are described later.

In other words, if the difference in optical path length ($L_{n+1} - L_n$) between two arbitrary multimode optical fibers in the above optical fiber bundle is larger than a value obtained by dividing 60 percent of the coherence length (Lc) of incident coherent light by the refractive index ($n_{core}$) of a core, the coherence of the above incident coherent light can be sufficiently reduced.

Further, it is desirable that the incident end and the outgoing end of incident coherent light in the above optical fiber bundle are respectively aligned.

Next, the action of the present invention will be described.

To determine the length of an optical fiber bundle and the difference in length between optical fibers composing the optical fiber bundle, it is necessary to obtain the temporal coherence of a light beam outgoing from the optical fiber.

Particularly, if mode dispersion among multimode optical fibers is equal to the coherence length of a multimode laser beam, it is not self-evident whether or not the difference in length between the optical fibers may be approximately the coherence length. Therefore, it is necessary to obtain the temporal coherence length of a light beam outgoing from the optical fiber using the impulse response theory of a multi-mode optical fiber.

As described above, Gloge ignored the mode in the radial direction of a multimode weakly-coupled optical fiber, analyzed in relation to only the propagation on a time base of power and obtained the impulse response of the multimode optical fiber.

In other words, if the modes of light beams propagated in a multimode optical fiber are weakly coupled, the movement of power occurs between the modes because of the fluctuation of a refractive index during propagation, the bending of the optical fibers and others. If there are multiple modes and a multimode light beam is propagated via the movement of power between modes many times. One input light beam spreads in some modes. In such a case, only the transfer function n the direction of the optical axis of an optical fiber is important.

Therefore, modes having the same propagation constant based upon the optical axis of an optical fiber can be effectively analyzed statistically as one group. In the following paragraphs, coherence propagation in a multimode optical fiber will be analyzed using the result of the analysis by Gloge of the above impulse response.

First, the power; pulse response Q (z, t) of a sufficiently long multimode optical fiber is obtained by the following mathematical expression 1. Mathematical expression 1 shows impulse response at time t at one point apart from the incident end of the multimode optical fiber by distance z.

(Mathematical Expression 1)

$$Q(z, t) = \Theta^2 \cdot \sqrt{\frac{\pi}{T \cdot t}} \cdot \frac{\text{Exp}\left[-\frac{\gamma\infty^2 z^2 T}{4 \cdot t} - \frac{t}{T}\right]}{\frac{1}{\gamma\infty z} \cdot \frac{t}{T} + \frac{1}{2}}$$

However, if in the mathematical expression 1, the radius of an optical fiber core is a, the wave length of a light beam is λ, the refractive index of the core is $n_1$, the coefficient of a mode attenuation constant is A and a power coupling constant is $d_0$, y•, • and T in the above mathematical expression 1 are respectively as follows.

(Mathematical Expression 2)

$$\gamma\infty = \frac{\lambda}{2 a n_1} \sqrt{A \cdot d_0}$$

$$\Theta\infty = 4 \sqrt{\frac{d_0}{A} \cdot \left(\frac{\lambda}{2 a n_1}\right)^2} \equiv \Theta_0$$

$$T = \frac{n_1}{2 \cdot c \cdot A}$$

Amplitude u (t) at the outgoing end of the optical fiber is as follows based upon the impulse response Q (z, t).

(Mathematical Expression 3)

$$u(t) = \int_0^\infty \sqrt{Q(z, t+t')} dt'$$

In other words, if the temporal coherence function of an incident light beam is γ, the temporal coherence function of an outgoing light beam is obtained as shown in the following expression using the above expressions. However, the following expression shows temporal coherence at time $t_1$, and at time $t_1+t'$.
(Mathematical Expression 4)

$$\langle u(t_1) \cdot u^*(t_1+t') \rangle = \langle \int\int \sqrt{Q(z,t_1)} \cdot \sqrt{Q(z,t_{1+t'})} \cdot dt_1 \cdot dt' \rangle = \int \int \gamma(t') \cdot \sqrt{Q(z,t_1)Q(z,t_{1+t'})} \cdot dt_1 \cdot d$$

Figure 4:
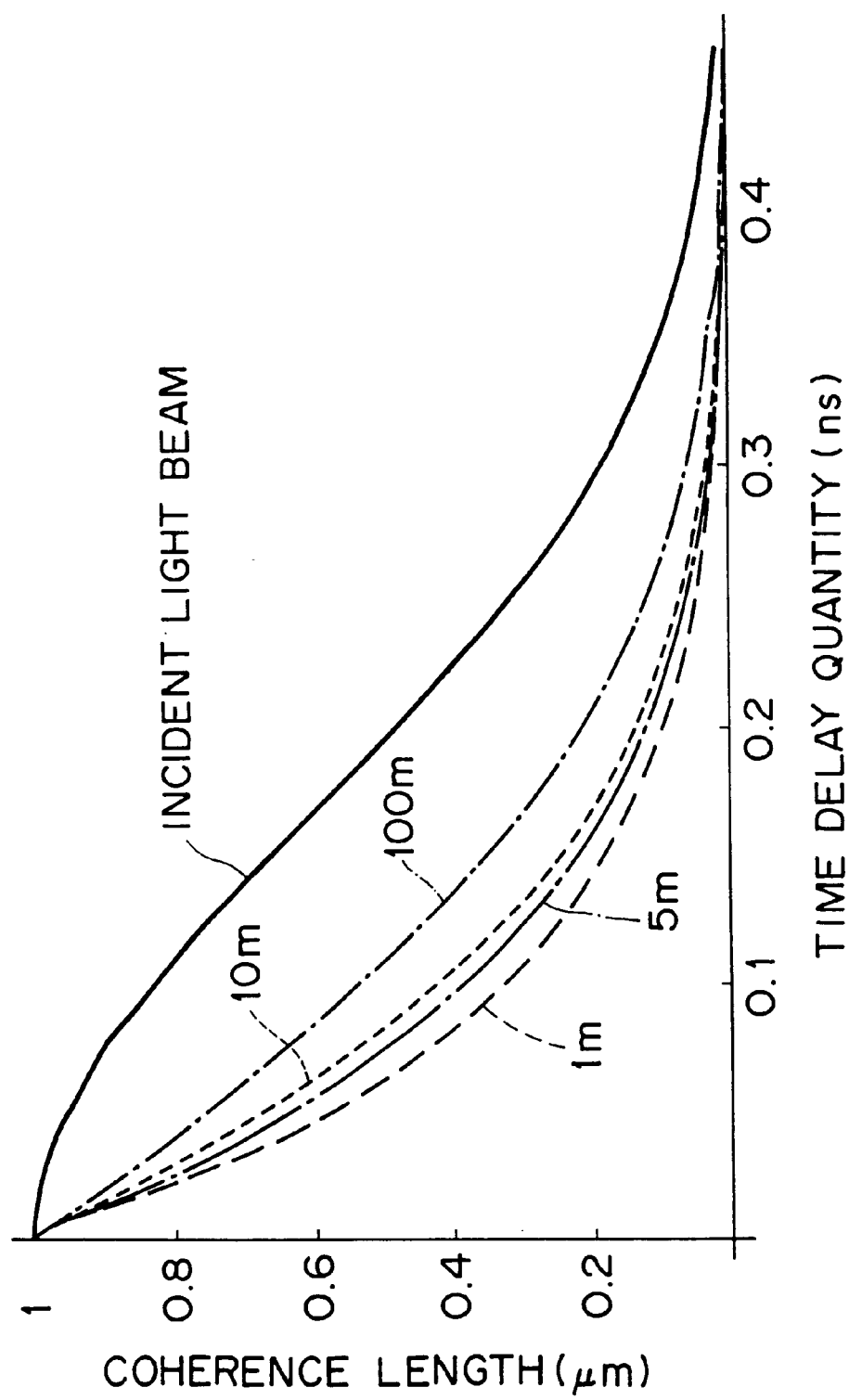
FIG. 4 is a graph showing the variation of the temporal coherence of a light beam outgoing from optical fibers having lengths of 1, 5, 10 and 100 meters(in case the coherence length Lc of an incident light beam is 70.0 mm)
Figure 6:
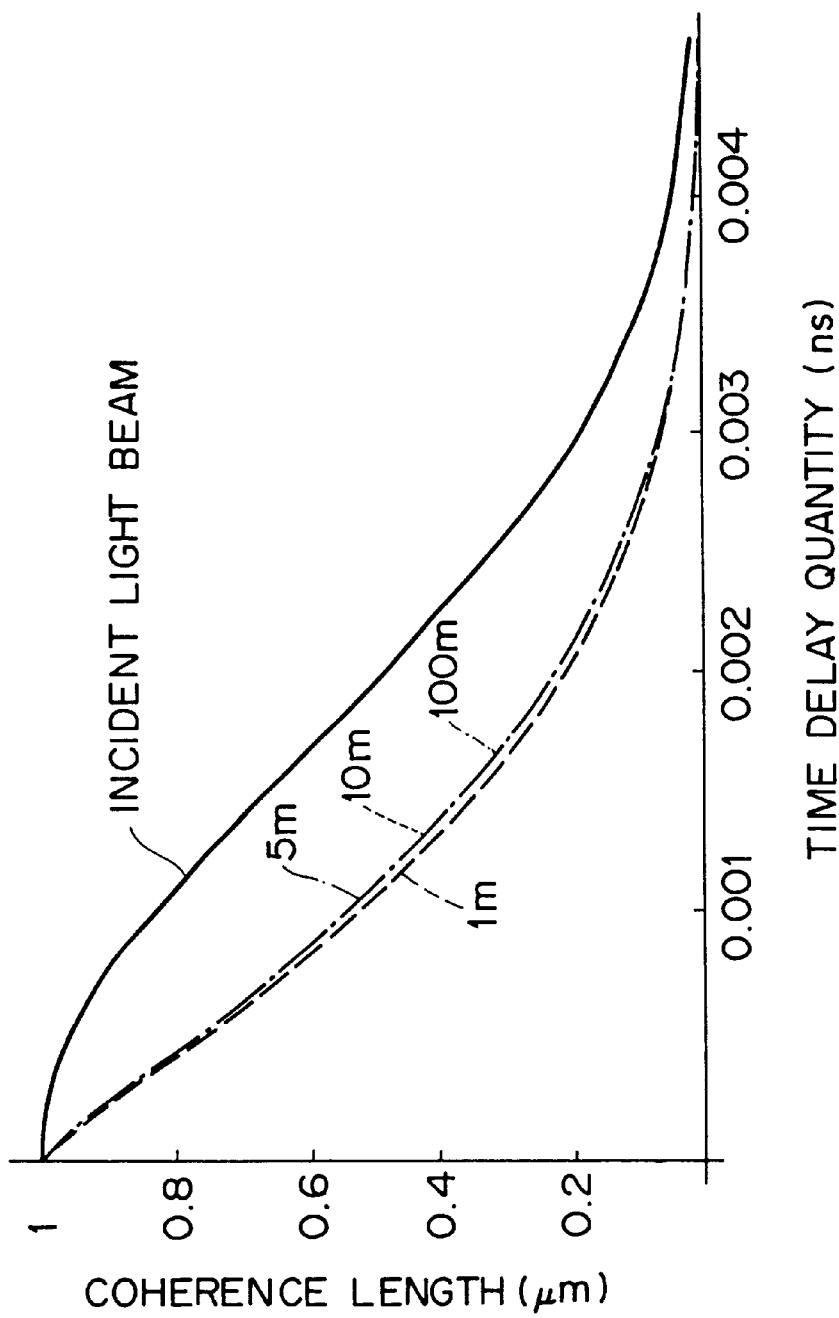
FIG. 6 is the other graph showing the variation of the temporal coherence of a light beam outgoing from an optical fiber for explaining the action (in case the coherence length Lc of an incident light beam is 0.70 mm)

FIGS. 4 to 6 show the result of the measurement of temporal coherence in the case optical fiber length L is 1 m, 5 m, 10 m and 100 m and the coherence length Lc of an incident light beam is 0.7 mm (as shown in FIG. 6), 7 mm (as shown in FIG. 5) and 70 mm (as shown in FIG. 4). Fitting is made according to the measurement data (Mitsubishi, MH4001, NA=0.3, 50 m, SI) of impulse response, and γ•, T and ••² are set as follows.

γ•=0.045 (1/m)

T=0.45 ns

••²=8.1×10⁻³

It is known from FIGS. 4 to 6 that the coherence length of a light beam outgoing from the optical fiber is reduced by up to approximately 60 percent, compared with the coherence length shown by a full line of a light beam before incidence on the optical fiber.

Also, it may be seen that as the length of the optical fiber is extended, the coherence length of a light beam increases slightly. This phenomenon is particularly noticeable when the coherence length of an incident light beam is long, as shown in FIG. 4. The phenomenon produced by the effect of equalization by the multimode dispersion of a multimode optical fiber.

Figure 3:
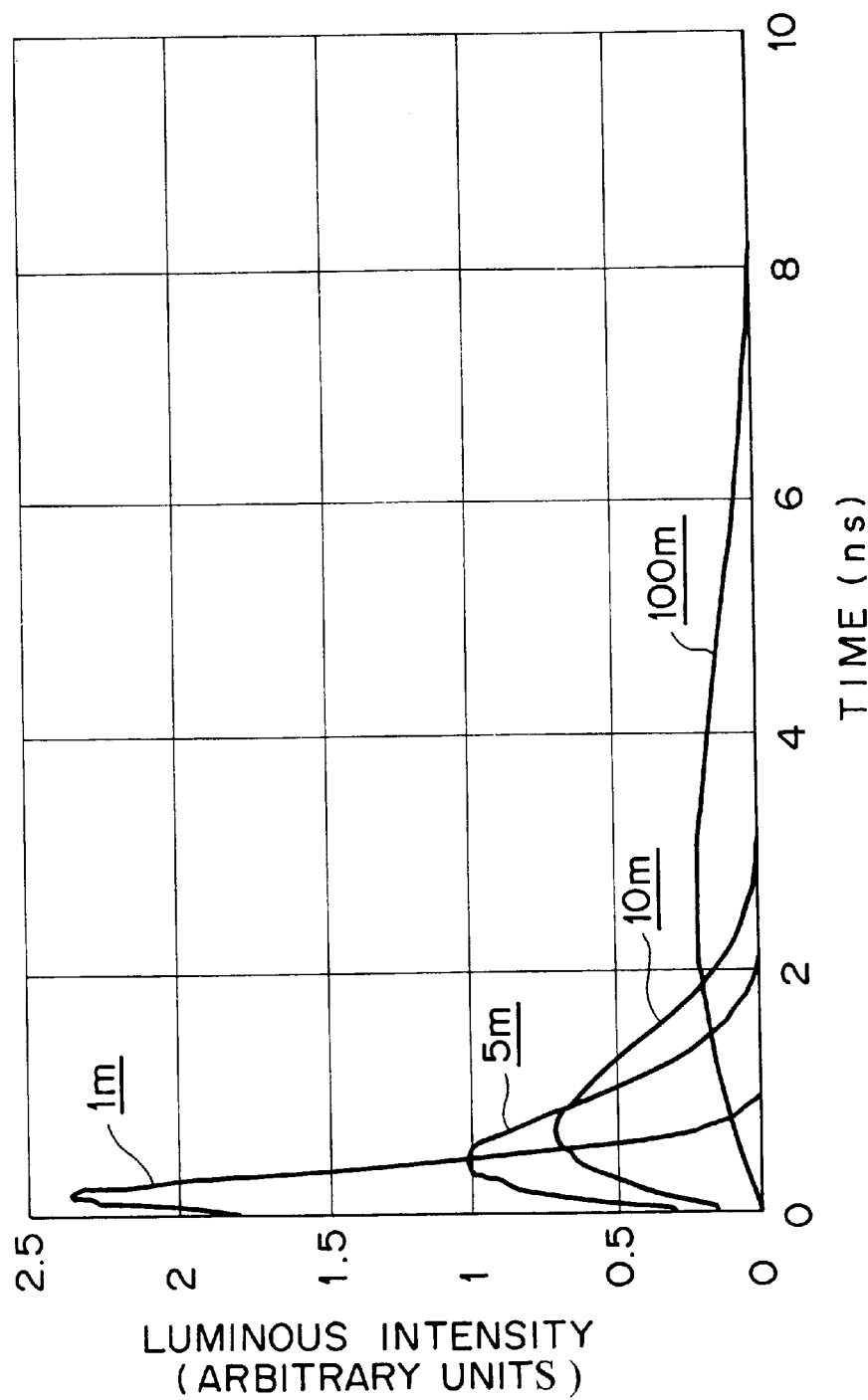
FIG. 3 is a graph showing impulse response for explaining the action of the present invention.

Further, it may be seen from FIG. 3 that as the length of the optical fiber is extended, the asymmetrical impulse response approaches a symmetrical Gaussian distribution, the pulse length is extended, and even though cut-off is unchanged, the correlation is increased before and after a pulse.

In any case, it is desirable that the optical fiber length is approximately a few m because the length of the optical fiber has only to be necessary and sufficient. An unnecessarily long optical fiber is not only wasteful in weight and volume, but the loss of a light beam during propagation tends to increase. Also, the coherence length of a laser beam emitted by a semiconductor laser, a laser beam emitted by a multimode solid state laser. Further, a laser beam obtained converting the wavelength utilizing its nonlinear optical effect can be set to approximately a few mm to a few tens of mm.

Therefore, in a practical design range, it may be seen from the above results that the coherence length of an outgoing light beam is reduced up to approximately 60 percent of the coherence length of an incident light beam. Coherence can be sufficiently reduce by bundling multimode optical fibers having a difference in optical path length exceeding the coherence length of an outgoing fight beam from each optical fiber or exceeding 60 percent of the coherence length of a light beam emitted from a light source.

In other words, if the coherence length of a light beam emitted from a light source is Lc, the length of the nth multimode optical fiber provided with the refractive index of a core, $n_{core}$ is $L_n$, coherence can be sufficiently reduced by bundling m pieces of multimode optical fibers provided with length $L_n$ (n=1, 2, . . . , m) which meets the following expressions:

$(L_n - L_n) \geq (0.6 \cdot Lc)/n_{core}$  Expression (1)

and $L_{n+1} - L_n > 0$  Expression (2)

As described above, in the present invention, it is desirable that the following expression comes into effect.

(Difference in optical path length)≧(60% of Lc of an outgoing light beam)/(the refractive index of the optical fibers' core).

Figure 7:
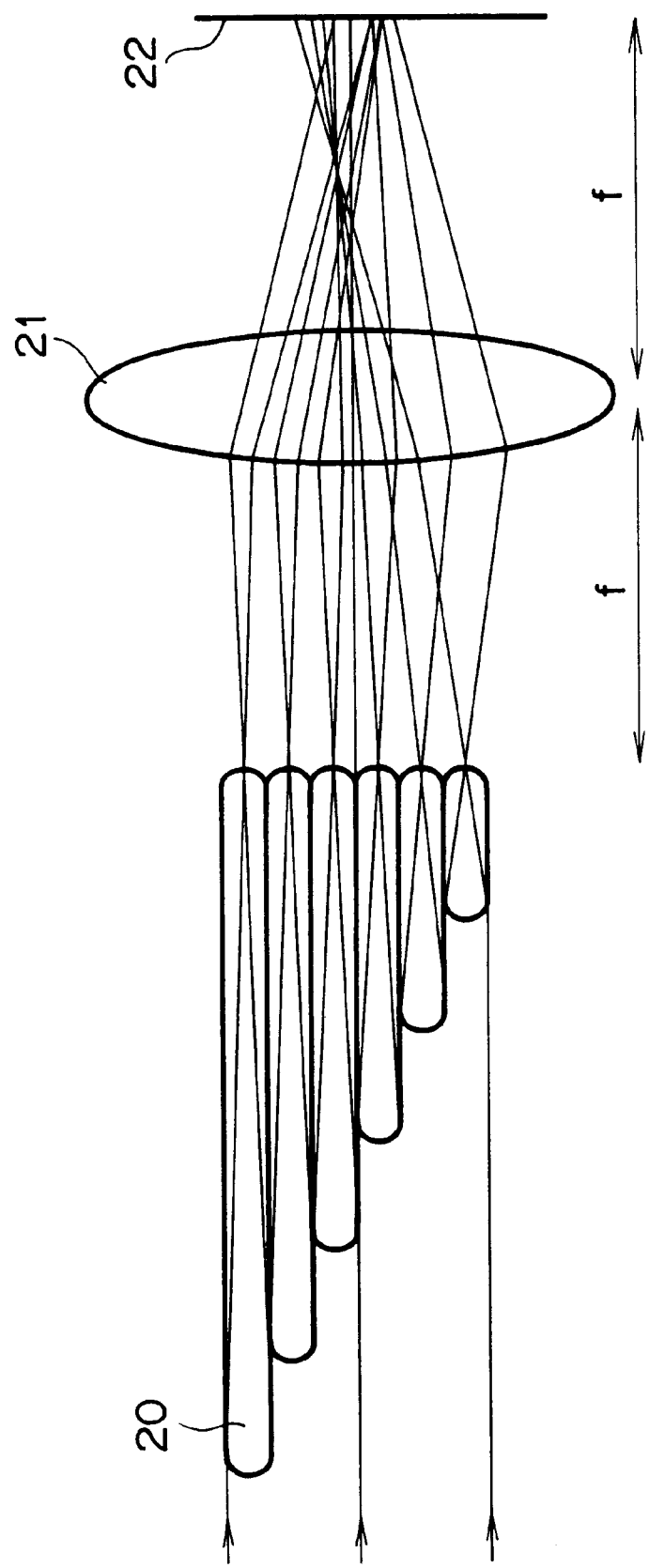
FIG. 7 is a partial schematic drawing showing a conventional type luminaire using a flying eye lens.
Figure 8:
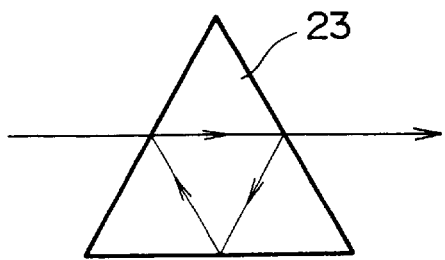
FIG. 8 is a partial schematic drawing showing a luminaire using a prism.
Figure 9:
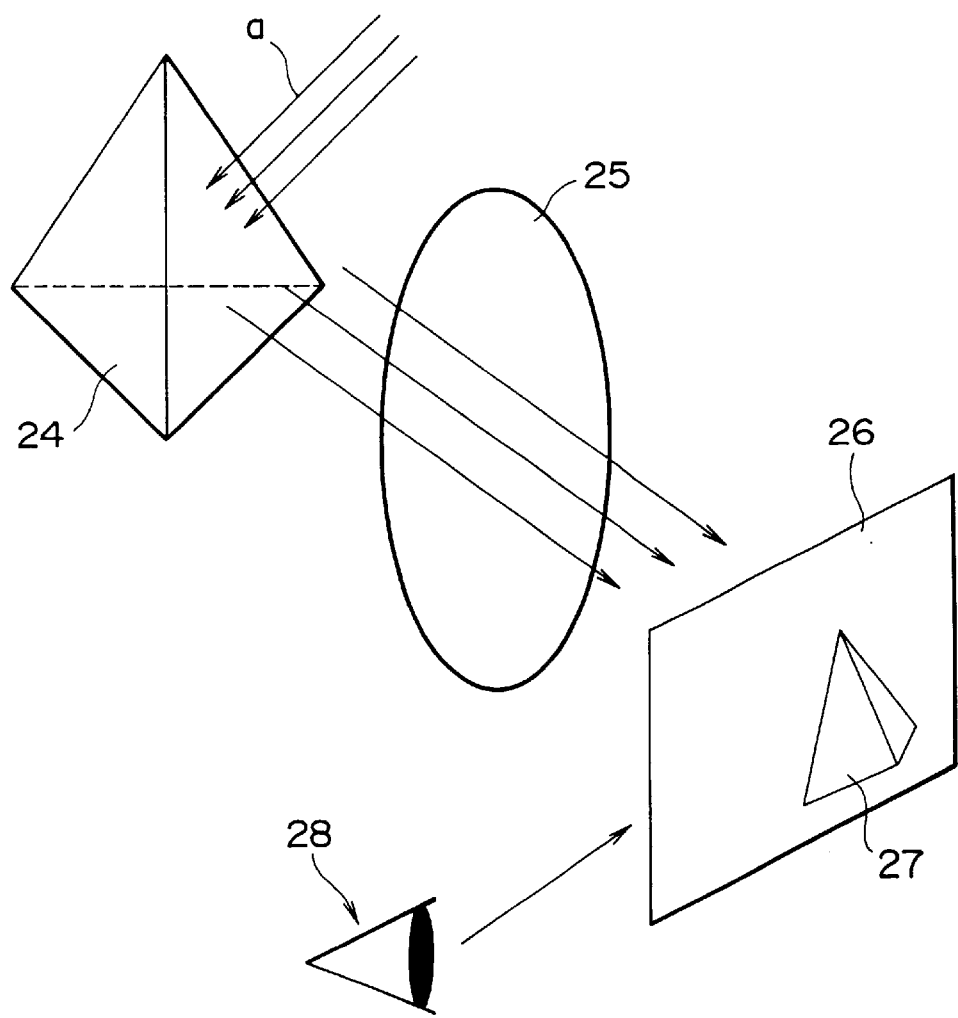
FIG. 9 is a schematic drawing for explaining the necessity of coherence control.
Figure 10:
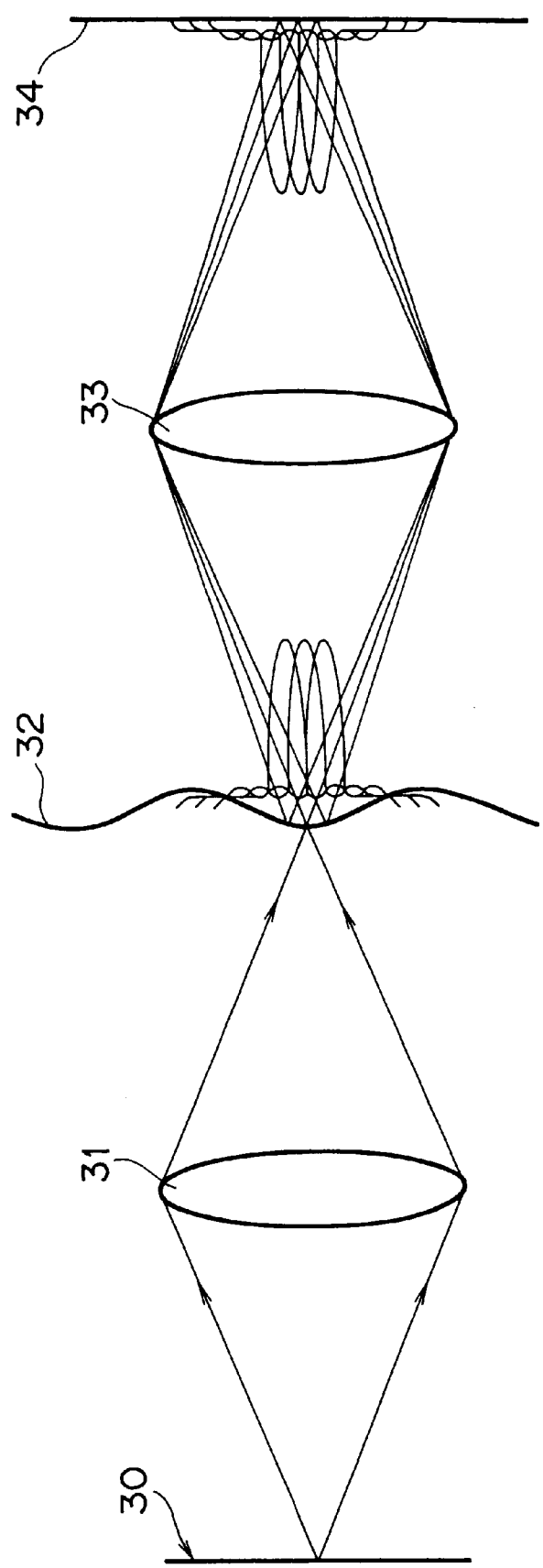
FIG. 10 is another schematic drawing of an object imaged on a screen and on a retina.

The easiest way for differentiating optical path length is to use the bundle of optical fibers different in length, as described above. However, in the case a device, such as the prism shown in FIG. 8, or the flying eye lens shown in FIG. 7 is used, its optical path length difference may also be determined based upon the above action. The above multimode optical fiber may also be a step index optical fiber or a graded index optical fiber. A step index plastic optical fiber (POF) is particularly desirable.

Other preferred embodiments of the present invention will be described below.

First Embodiment

As shown in FIGS. 1A and 1B, the incident end 3 and the outgoing end 4 of plural multimode optical fibers 2a, 2b, 2c, 2d, . . . , having a difference in length exceeding the coherence length of an outgoing light beam from each optical fiber, are respectively aligned. A multimode optical fiber bundle 1 is composed of plural multimode optical fibers having a difference in length exceeding the coherence length of an outgoing light beam, bundled together.

Particularly, it is desirable that bundling at the incident end 3 and at the outgoing end 4 is carried out as densely as possible, as shown in FIG. 1B, in view of the coupling efficiency of an outgoing or incident laser beam. Considering symmetry, a layout composing a regular hexagon, a closed hexagonal packing structure, which is a type of crystalline structure, is the most advantageous.

Also, each multimode optical fiber 2a, 2b, 2c, 2d, . . . is provided with a double structure composed of a core 6 having a large refractive index and a clad 5 having a relatively small refractive index. The length of each fiber is different in the multimode optical fiber bundle 1. The difference in length, that is, the difference in optical path length, has only to be provided with a difference in length exceeding the coherence length of an outgoing light beam according to the characteristic composition of the present invention. It is further desirable that the above difference in length exceeds 60 percent of the coherence length of incident coherent light, but does not exceed 100 percent.

For a method of bundling plural different length multimode optical fibers as described above, any optical fiber may be curvedly folded so that it is longer than the other fibers by a length exceeding the coherence length of an outgoing light beam as shown in FIG. 1A. Even if the folded part 14 is provided, the incident end 3 and an outgoing end 4 of the multimode optical fiber bundle 1 are respectively common among the fibers or located in the same position. As described above, ambient space is effectively utilized by a fold, etc., and the above difference in length can be easily and compactly realized because the multimode optical fiber 2a, 2b, 2c, 2d, . . . are used. The shape of a fiber is not limited to that shown in FIG. 1. A fiber can be composed in an arbitrary shape utilizing the magnitude of the curvature of the folded part of n optical fiber.

Therefore, in the multimode optical fiber bundle 1 shown in FIG. 1, coherent light α, incident on a fiber bundle part on the incident side 3 in which the plural multimode optical fibers 2a, 2b, 2c, 2d, . . . are bundled, is outgoing as a light beam, the coherence of which is sufficiently reduced. Ideally as an incoherent light beam via the multimode optical fiber bundle 1.

In other words, coherent light a (particularly a laser beam) incident on the fiber bundle part on the incident side 3 is incident on each multimode optical fiber 2a, 2b, 2c, 2d, . . . with the same or approximately the same luminous intensity and is outgoing as light beams (a), (b), (c), (d), . . . the temporal coherence and the spatial coherence which are reduced by mode dispersion in the respective multimode optical fibers.

As each multimode optical fiber is provided with a difference in length (i.e. difference in optical path length) according to the characteristic composition of the present invention, light beams (a), (b), (c), (d), . . . outgoing from a fiber bundle part on the outgoing side 4 of each multimode optical fiber are provided with a phase difference corresponding to the above difference in optical path length. Therefore, light beams outgoing from the respective multimode optical fibers are not mutually provided with coherence. When these light beams (particularly multimode laser beams) are synthesized, they become a substantially incoherent light beam (particularly a laser beam) which is large in luminous intensity, excellent in directivity and reduced in coherence.

Therefore, incident coherent light is substantially converted to an incoherent light beam by propagating the incident coherent light via the optical fiber bundle simply composed, as described above. This incoherent light beam can be utilized for illumination. Particularly, this incoherent light beam can be useful for illumination of a display, a measuring device, a microscope, an exposure device, etc., the speckle of which is reduced. Also, the effect of reducing coherence is sufficient and the intensity distribution is uniform because coherence is reduced via the multimode optical fibers (i.e. the multimode optical fiber bundle). Further, there is also an advantage in that optical loss is small.

FIG. 2 shows a display (a laser display) using the multimode optical fiber bundle 1 shown in FIG. 1.

In the display shown in FIG. 2, first, a laser beam outgoing from a laser resonator 7 is incident on a lens 8. Next, laser beams focused by the lens 8 are incident on the incident end 3 of the multimode optical fiber bundle 1.

Laser beams outgoing via the multimode optical fiber bundle 1 and an optical fiber 9 illuminate a spatial optical modulator (i.e. a transmission light valve) 11 composed of, for example, transmission liquid crystal display elements, via a lens 10. The optical fiber 9 may also be a bundle of multimode optical fibers or another optical fiber coupled to the multimode optical fiber bundle 1 at the outgoing end 4.

An image is projected on a screen 13 by the spatial optical modulator 11 via a projecting lens 12. The image is provided with high luminance, high definition and sufficient contrast by a high intensity illuminating light from the lens 10. As described above, speckle is reduced both on the screen and on the retina of an observer observing the screen because the coherence of illuminating light for illuminating the spatial optical modulator 11 is reduced by the above effect.

For the laser resonator 7, a solid state laser, a semiconductor laser, a gas laser, a dye laser, etc., can be used. Also, these higher harmonics, such as second and fifth harmonic generation of an Nd: YAG laser, can also be used. To obtain light in three primary colors, a light source such as an LED and a lamp other than a laser may also be used together with a laser beam source. Plural light sources may also be provided. For example, a semiconductor laser, the efficiency of which is high and the handling of which is easy even if output is low, can be used. In such a case, when light beams emitted from the plural light sources are synthesized, the fiber bundle of the present invention may also be used.

Next, design examples will be described for the cases in which the optical systems shown in FIGS. 1 and 2 are used and the higher harmonics of a solid state laser (the second harmonic generation of the Nd: YAG laser) or a semiconductor laser is used for a light source. For the example using a plastic optical fiber (POF), a plastic optical fiber provided with the following specifications is examined.

Specifications of a plastic optical fiber
NA: 0.3
Refractive index of core/that of clad: 1.495
Type of optical fiber: Step index optical fiber

DESIGN EXAMPLE 1

A speckle removing optical system with the second harmonic generation (SHG) of an Nd: YAG laser used for a light source:

Light source: SHG of Nd: YAG laser
Output: 5 W
Mode: Longitudinal and transverse multimodes
Wavelength: 532 nm
Wavelength range (±): 0.004 nm
Coherence length: 7 mm
Beam speckle contrast: up to 1
POF transmissivity: 0.08 dB/m
5 m transmissivity: up to 90%
Difference in optical fiber length: >2.8 mm
Speckle allowable contrast 10%: 100 pieces or more
Speckle allowable contrast 5%: 400 pieces or more If the length of the nth multimode optical fiber provided with the coherence length Lc of incident coherent light of 7 mm and the refract live index of the core, $n_{core}$ of 1.495 is $L_n$, then $(L_{n+1}-L_n)$, that is, the difference L in optical path length between the nth multimode optical fiber and the (n+1)th multimode optical fiber is as follows based upon the above mathematical expression 1, and the above difference>2.8 mm in length between the optical fibers is obtained.

$$L \geq (0.6\ Lc)/n_{core} \approx 2.8$$

Also, if the length of the shortest optical fiber is 1 m and the difference in length between optical fibers is 1, it is desirable that 100 pieces of fiber, the length of each of which is 1 to 2 m, are bundled if the allowable speckle contrast is 10%. It is desirable that 400 pieces of fibers, the length of each of which is 1 to 5 m, are bundled if the speckle allowable contrast is 10% and 5%.

DESIGN EXAMPLE 2

A speckle removing optical system with a red semiconductor laser used for a light source:

Light source: Semiconductor laser
Output: 30 mW
Mode: Longitudinal and transverse multimodes
Wavelength: 650 Wavelength range (±): 2 nm Coherence lengthy 20 mm Beam speckle contrast: 0.65

POF transmissivity: 0.12 dB/m 5 m transmissivity: 85%

Difference in optical fiber length: >8.0 mm

Speckle allowable contrast 10%: 43 pieces or more

Speckle allowable contrast 5% : 169 pieces or more

If the length of the nth multimode optical fiber provided with the coherence length Lc of incident coherent light of 20 mm and the refractive index of the core, $n_{core}$ of 1.495 is $L_n$, then $(L_{n+1}-L_n)$, that is, the difference L in optical path length between the nth multimode optical fiber and the (n+1) the multimode optical fiber is as follows based upon the above mathematical expression 1, and the above difference>8.0 mm in length between the optical fibers is obtained.

$$L \geq (0.6 \cdot Lc)/n_{core} = 8.0$$

Also, if the length of the shortest optical fiber is 1 m and the difference in length between optical fibers is 2 cm, it is desirable that 43 pieces of fibers, the length of each of which is 1 to 1.86 m, are bundled if the allowable speckle contrast is 10%. It is desirable that 169 pieces of fibers, the length of each of which is 1 to 4.38 m, are bundled if the speckle allowable contrast is 10% and 5%.

As described above, according to this embodiment:

(1) simple, low-priced and high-performance coherence control is executed for various lasers which can be used for a light source for illuminating an object wherein speckle is reduced.

(2) The efficiency of the multimode optical fiber bundle can be enhanced, the bundle can be miniaturized and lightened and the cost of the bundle can be reduced.

(3) Uniformity of illumination can be readily achieved, at low cost and in a small space by the overlap of spatial modes of multimode optical fibers.

(4) An optical device, such as a display, a measuring device, a microscope and an exposure device can be composed using a laser high in photoelectric transfer efficiency. Hereby, the performance of these optical devices is enhanced, the optical devices are miniaturized, and their cost is reduced.

The preferred embodiments of the present invention are described above. However the present invention is not limited to these embodiments.

For example, the length of the above plural multimode optical fibers can be differentiated so that the length exceeds the coherence length of the above coherent light by bending any of the above plural multimode optical fibers. However, the way a multimode optical fiber is bent is not limited to that noted above. Various shapes may be selected to meet the above length conditions. Particularly, it is desirable that the above multimode optical fiber is a plastic optical fiber because the transmissivity is high and radius of curvature is large.

A hollow multimode optical fiber may also be used for the above multimode optical fiber. The above incident coherent light may also be an ultraviolet laser beam (that is, a laser for emitting an ultraviolet laser beam may also be used for the above light source). Hereby, an optical device using an ultraviolet light beam for a light source, such as a measuring device, a microscope and an exposure device, can be realized.

Also, in the illuminating method and the luminaire of the present invention, speckle is inhibited by illuminating a liquid crystal element and the spatial optical modulator composed of micro mirrors, etc., using the above illuminating light and projecting an image on the screen. Further, a display provided with high luminance and high definition is realized.

A measuring device having high measuring precision is also realized by illuminating a measured object using the above illuminating light and measuring the shape of the object, reflection and/or the intensity and others of a transmitted light beam. Also, a microscope a using the above illuminating light, such as a fluorescence microscope, may be realized. Further, an exposed image with sufficient contrast and having a large depth of focus may be obtained by using the above illuminating light (particularly an ultraviolet laser beam) for a light source and illuminating an exposed object via mask, etc., by an ultraviolet exposure device in particular.

According to the coherence reduction method of the present invention, the difference in optical path length between two arbitrary multimode optical fibers in the optical fiber bundle is larger than the coherence length of an outgoing light beam from any multimode optical fiber, and the minimum difference in optical path length necessary to sufficiently reduce the coherence of incident coherent light is generated because plural multimode optical fibers which have a difference in optical path length exceeding the coherence length of an outgoing light beam are used, and the coherence of incident coherent light is reduced via the optical fiber bundle in which these multimode optical fibers are bundled.

Particularly, plural optical fibers which have a difference in length exceeding the coherence length of a light source are not required to be bundled, as disclosed in the Japanese Published Unexamined Patent Application No. Hei 6-167640, because the optical fiber bundle in which plural multimode optical fibers which have a difference in optical path length exceeding the coherence length of an outgoing light beam from the multimode optical fiber are bundled is used, and the coherence length of an outgoing light beam from the multimode optical fiber is sufficiently shorter than the coherence length of incident coherent light, as described above. The length of each optical fiber can be sufficiently reduced, compared with a case in which the above plural optical fibers are bundled. Therefore, the optical fiber bundle composed of such optical fibers can be miniaturized and lightened. Simultaneously, the coherence of incident coherent light can be sufficiently reduced.

According to the coherence reduction device of the present invention, the coherence reduction method of the present invention can be executed repeatedly and simultaneously because plural multimode optical fibers which have a difference in optical path length exceeding the coherence length of an outgoing light beam are used and the coherence of incident coherent light is reduced via the optical fiber bundle in which these multimode optical, fibers are bundled. Therefore, a small-sized and simple optical coherence reduction device can be realized.

According to the illuminating method according to the present invention, a difference in optical path length between two arbitrary multimode optical fibers in the optical fiber bundle is larger than the coherence length of an outgoing light beam from any multimode optical fiber because plural multimode optical fibers which have a difference in optical path length, exceeding the coherence length of an outgoing light beam are used, the coherence of incident coherent light emitted from a light source is reduced via the optical fiber bundle in which these multimode optical fibers are bundled, and a light beam, the coherence of which is reduced, is utilized for illumination. Therefore, the minimum necessary difference in optical path length to reduce the coherence of incident coherent light sufficiently is generated, and a light beam, the coherence of which is reduced, can be effectively utilized for illumination.

According to the luminaire according to the present invention, the illuminating method of the present invention can be executed repeatedly and simultaneously because plural multimode optical fibers which have a difference in optical path length exceeding the coherence length of an outgoing light beam are used, the coherence of incident coherent light emitted from a light source is reduced via the optical fiber bundle in which these multimode optical fibers are bundled, and an outgoing light beam, the coherence of which is reduced, is utilized for illumination. Therefore, a small-sized and simple luminaire can be realized.

The length of each optical fiber can be sufficiently reduced, compared with a case in which plural optical fibers which have a difference in length exceeding the coherence length of a light source are bundled, because in the optical fiber bundle of the present invention, (that is plural multimode optical fibers which have a difference in optical path length exceeding the coherence length of an outgoing light beam from the respective multimode optical fibers) are bundled. As described above, the coherence length of an outgoing light beam from the multimode optical fiber is sufficiently shorter than the coherence length of incident coherent light, plural optical fibers which have a difference in length exceeding the coherence length of a light source are not required to be bundled, as disclosed in the Japanese Published Unexamined Patent Application No. Hei 6-167640. Therefore, the small-sized and light optical fiber bundle provided with a function for sufficiently reducing coherence can be realized.

What is claimed is:

1. An optical coherence reduction method, comprising the steps of:
    forming a plurality of multimode optical fibers with a difference in optical path length exceeding a coherence length of an outgoing light beam; and
    bundling said plurality of multimode optical fibers into an optical fiber bundle to reduce a coherence of incident coherent light.

2. An optical coherence reduction method according to claim 1, wherein said plurality of multimode optical fibers have a difference in length exceeding said coherence length of said outgoing light beam.

3. An optical coherence reduction method according to claim 2, wherein said plurality of multimode optical fibers are formed to have a difference in length exceeding 60 percent of a coherence length of said incident coherent light.

4. An optical coherence reduction method according to claim 3, wherein said plurality of multimode optical fibers are formed to have a difference in length not exceeding 100 percent of said coherence length of said incident coherent light.

5. An optical coherence reduction method according to claim 3, wherein $(L_{n+1}-L_n) \geq (0.6 \cdot Lc)/n_{core}$, and wherein
    said optical fiber bundle comprises m multimode optical fibers, said coherence length of said incident coherent light is Lc, a length of an nth multimode optical fiber is $L_n$ and each fiber is provided with a core having a refractive index of $n_{core}$.

6. An optical coherence reduction method according to claim 1, wherein an incident end for said incident coherent light and an outgoing end of said optical fiber bundle for said outgoing light beam are aligned.

7. An optical coherence reduction method according to claim 1, wherein said incident coherent light is selected from the group consisting of a laser beam emitted from a semiconductor laser, a laser beam emitted from a solid state laser, a laser beam emitted from a gas laser, a laser beam emitted from a dye laser, a laser beam emitted from an ND:Yag laser and a laser beam acquired by nonlinearly converting a wavelength of a laser beam emitted from a solid state laser.

8. An optical coherence reduction device, comprising a plurality of multimode optical fibers provided with a difference in optical path length exceeding a coherence length of an outgoing optical beam, wherein said plurality of multimode optical fibers have been formed into an optical fiber bundle, whereby a coherence of incident coherent light is reduced.

9. An optical coherence reduction device according to claim 8, wherein:
    said plurality of multimode optical fibers have a difference in length exceeding said coherence length of said outgoing optical beam.

10. An optical coherence reduction device according to claim 9, wherein said plurality of multimode optical fibers have a difference in length exceeding 60 percent of a coherence length of said incident coherent light.

11. An optical coherence reduction device according to claim 10, wherein $(L_{n+1}-L_n) \geq (0.6 \cdot Lc)/n_{core}$, and wherein
    wherein said optical fiber bundle comprises m multimode optical fibers, said coherence length of said incident coherent light is Lc, a length of an nth multimode optical fiber is $L_n$ and each fiber is provided with a core having a refractive index of $n_{core}$.

12. An optical coherence reduction device according to claim 10, wherein:
    said plurality of multimode optical fibers have a difference in length not exceeding 100 percent of said coherence length of said incident coherent light.

13. An optical coherence reduction device according to claim 8, wherein:
    an incident end of said optical fiber bundle for said incident coherent light is aligned with an outgoing end of said optical fiber bundle.

14. An optical coherence reduction device according to claim 8, wherein said incident coherent light is selected from the group consisting of a laser beam emitted from a semiconductor laser, a laser beam emitted from a solid state laser, a laser beam emitted from a gas laser, a laser beam emitted from a dye laser, a laser beam emitted from an ND:Yag laser and a laser beam acquired by nonlinearly converting a wavelength of a laser beam emitted from a solid state laser.

15. An illuminating method, comprising the steps of:
    forming a plurality of multimode optical fibers with a difference in optical path length exceeding a coherence length of an outgoing light beam;
    bundling said plurality of multimode optical fibers into an optical fiber bundle to reduce a coherence of incident coherent light; and
    using a light beam, the coherence of which is thereby reduced, for illumination.

16. An illuminating method according to claim 15, wherein said plurality of multimode optical fibers have a difference in length exceeding said coherence length of said outgoing light beam.

17. An illuminating method according to claim 16, wherein said plurality of multimode optical fibers are formed to have a difference in length exceeding 60 percent of a coherence length of said incident coherent light.

18. An illuminating method according to claim 17, wherein said plurality of multimode optical fibers are formed to have a difference in length not exceeding 100 percent of said coherence length of said incident coherent light.

19. An illuminating method according to claim 17, wherein $(L_{n+1}-L_n) \geq (0.6 \cdot Lc)/n_{core}$, and wherein said optical fiber bundle comprises m multimode optical fibers, said coherence length of said incident coherent light is Lc, a length of an nth multimode optical fiber is $L_n$ and each fiber is provided with a core having a refractive index of $n_{core}$.

20. An illuminating method according to claim 15, wherein said light beam for illumination is utilized for one or more selected from the group consisting of a display, a measuring device, a microscope or an exposure device.

21. An illuminating method according to claim 15, wherein an incident end for said incident coherent light and an outgoing end of said optical fiber bundle for said outgoing light beam are aligned.

22. An illuminating method according to claim 15, wherein said incident coherent light is selected from the group consisting of a laser beam emitted from a semiconductor laser, a laser beam emitted from a solid state laser, a laser beam emitted from a gas laser, a laser beam emitted from a dye laser, a laser beam emitted from an ND:Yag laser and a laser beam acquired by nonlinearly converting a wavelength of a laser beam emitted from a solid state laser.

23. A luminaire, comprising a plurality of multimode optical fibers with a difference in optical path length exceeding a coherence length of an outgoing light beam, wherein said plurality of multimode optical fibers have been formed into an optical fiber bundle to reduce a coherence of an incident coherent light, and wherein a light beam, the coherence of which is thereby reduced, is used for illumination.

24. A luminaire according to claim 23, wherein said plurality of multimode optical fibers have a difference in length exceeding said coherence length of said outgoing light beam.

25. A luminaire according to claim 24, wherein said plurality of multimode optical fibers have a difference in length exceeding 60 percent of a coherence length of said incident coherent light.

26. A luminaire according to claim 25, wherein said plurality of multimode optical fibers have a difference in length not exceeding 100 percent of said coherence length of said incident coherent light.

27. A luminaire according to claim 25, wherein $(L_{n+1}-L_n) \geq (0.6 \cdot Lc)/n_{core}$, and wherein said optical fiber bundle comprises m multimode optical fibers, said coherence length of said incident coherent light is Lc, a length of an nth multimode optical fiber is $L_n$ and each fiber is provided with a core having a refractive index of $n_{core}$.

28. A luminaire according to claim 23, wherein said light beam for illumination is utilized for one or more selected from the group consisting of a display, a measuring device, a microscope or an exposure device.

29. A luminaire according to claim 23, wherein an incident end for said incident coherent light and an outgoing end of said optical fiber bundle are aligned.

30. A luminaire according to claim 23, wherein said incident coherent light is selected from the group consisting of a laser beam emitted from a semiconductor laser, a laser beam emitted from a solid state laser, a laser beam emitted from a gas laser, a laser beam emitted from a dye laser, a laser beam emitted from an ND:Yag laser and a laser beam acquired by nonlinearly converting a wavelength of a laser beam emitted from a solid state laser.

31. An optical fiber bundle, comprising a plurality of multimode optical fibers provided with a difference in optical path length exceeding a coherence length of an outgoing light beam.

32. An optical fiber bundle according to claim 31, wherein said plurality of multimode optical fibers have a difference in length exceeding said coherence length of said outgoing light beam.

33. An optical fiber bundle according to claim 32, wherein said plurality of multimode optical fibers have a difference in length exceeding 60 percent of a coherence length of an incident coherent light.

34. An optical fiber bundle according to claim 33, wherein said plurality of multimode optical fibers have a difference in length not exceeding 100 percent of said coherence length of said incident coherent light.

35. An optical fiber bundle according to claim 33, wherein $(L_{n+1}-L_n) \geq (0.6 \cdot Lc)/n_{core}$, and wherein said optical fiber bundle comprises m multimode optical fibers, said coherence length of said incident coherent light is Lc, a length of an nth multimode optical fiber is $L_n$ and each fiber is provided with a core having a refractive index of $n_{core}$.

36. An optical fiber bundle according to claim 31, wherein an incident end and an outgoing end are aligned.

* * * * *